Patented Aug. 24, 1943

2,327,872

UNITED STATES PATENT OFFICE 2,327,872

METHOD OF MAKING SYNTHETIC
MATERIALS SUCH AS FIBERS

Joseph Dahle, Boston, Mass., assignor to Pro-phy-lac-tic Brush Company, Northampton, Mass., a corporation of Delaware No Drawing. Application July 1, 1940,
Serial No. 343,439

1 Claim. (Cl. 18—54)

This invention has to do with the production of certain novel products composed of long-chain polymers, said products having physical and chemical properties different from the original base material. In the practice of my invention the physical properties of the base material are first modified by physical treatment such as stretching and thereafter the modification is fixed by chemical treatment, which we believe fixes the molecules in the position taken up by them during the physical treatment. It will be understood that the final product differs from the base material both in its physical and chemical aspects.

It has been known for some time that the physical properties of certain organic compounds may be modified by physical treatment, for instance, by stretching, and it has generally been believed that this change is due to orientation of the molecules of which the material is composed. This is particularly true of materials composed of large long molecules which are essentially unbranched. However, it has not been possible to take full advantage of these properties resulting from the physical treatment since the modification of the physical properties has not always been permanent, particularly if the material is subsequently subjected to heat or to the action of swelling or dispersing agents.

I have discovered that where the material employed is a reactive linear polymer, i. e., one in which the chains forming the molecules have reactive groups on the chain, the effects of the physical treatment may be fixed by subsequent chemical treatments. While the action is perhaps not known with certainty, I believe that the chemical treatment results in tying together in some way the molecules in the position given them by the physical treatment so that thereafter they resist forces which tend to change their position and therefore that the results of the physical treatment are more permanent.

While the experiments which have led to my discovery have been carried out chiefly with polyvinyl alcohol as a base, I believe that the method may be applicable also to other vinyl polymers and co-polymers which contain reactive groups, as for example, hydroxyl groups or carboxyl groups; and to other polymers having actual or potential trifunctional groups, and to mixtures of such polymers. The process is not applicable to unreactive linear polymers, such as polyamides unless possibly after treatment to convert them from unreactive to reactive polymers.

In the case of polyvinyl alcohol and other long-chain polymers containing hydroxyl groups, suitable agents for reaction with the reactive groups of the polymer chains may be acids, monobasic and polybasic aldehydes, or ketones, etc.

The process embodying my invention results in the production of filamentary materials having remarkable physical properties. It also enables one to obtain in oriented form substances which because of their particular molecular pattern are not readily oriented. Also, water soluble reactive linear polymers may be employed, and thus the use of expensive solvents is unnecessary and the cost of recovery equipment and its operation is eliminated.

My invention is applicable particularly to the manufacture of filaments in general, bristles, fibers, sheets, plates, tubes, rods and the like. My improved process not only produces a striking change in the physical properties of the material composing the resulting product but these physical properties may be rendered permanent under the conditions of use. For instance, a filament made from polyvinyl alcohol and having a tensile strength of less than 15,000 lbs. per square inch can, by suitable physical treatment followed by appropriate chemical treatment, be given a tensile strength of from 50,000 to 70,000 lbs. per square inch or even higher, together with increased resilience and resistance to water, and these properties persist during use.

The chemical action which results in the fixation of the physical properties apparently involves condensation and also to a certain extent cross linkage, but the exact nature of it is unimportant.

My invention can be readily understood by considering a procedure which I have employed in the manufacture of filaments and bristles from polyvinyl alcohol. In this case the polyvinyl alcohol is mixed with water, and is then formed into filaments or a mono-fil preferably by being extruded through an orifice while in a relatively plastic state into air or into a suitable bath. The mixture should be close to the gel or congealing point at the time of issuing from the orifice. The filaments are then dried sufficiently to render them strong enough to endure the stretching force without breaking. For the best results it is necessary to do this stretching before the material is completely dried, preferably when the water content is in the neighborhood of 20–35% of the total.

The material is next stretched, i. e., it is elongated beyond the elastic limit, the force applied varying from 10 to 75 per cent of the ultimate tensile strength. The stretching is believed to change the arrangement of the molecules or, in other words, to orient them.

Thereafter the filaments, preferably while under stress, are reacted with an active material, such as an aldehyde, a ketone, or a dibasic acid. Regardless of the theory of what occurs, the effect of the chemical treatment is to fix the effect of the physical treatment, and also to give to the final product other properties depending on the nature of the active material employed. Properties which may be given to the final product are high tensile strength and high water resistance.

The invention may also be practiced by including in the mix the active material, for instance, an aldehyde, and after forming the composition into filaments or a mono-fil subjecting these to some treatment such as heating or the application of a catalyst which will induce chemical union between the basic material and the active material.

In the manufacture of filaments or mono-fils the physical treatment employed to change the molecular arrangement of the material is stretching but it will be understood that the essential physical treatment is a deformation of the material which results in a rearrangement of molecules and that this physical treatment may be obtained in a variety of ways dependent upon the use to which the material is to be put.

My invention is applicable only to reactive long-chain polymers. For instance, it may be practiced very successfully with polyvinyl alcohol as a base material but it cannot be with polyvinyl acetals, the acetalization of which is complete or practically complete. It is, however, at least theoretically possible to carry out the process with partial polyvinyl acetals since in them there is present a number of unreacted hydroxyl groups which have not been condensed with the aldehyde and which therefore are still available for reaction with modifying agents.

The treatment herein described not only imparts resiliency and high tensile strength, approaching or even equalling that of steel, but also changes other physical properties, for instance, the solubility characteristics.

I am aware that filaments have been formed from polyvinyl alcohol and its derivatives and that such materials have been stretched to improve their physical properties by orientation. I am aware that polyvinyl alcohol or other materials containing hydroxyl groups have been reacted with acids, aldehydes, ketones, etc., thereby changing the properties. I am also aware that filaments formed from acetals (i. e., materials containing hydroxyl groups condensed with aldehydes, etc.) have been stretched during their formation into filaments. However, none of these procedures produce materials comparable to materials produced by the herein described invention and in no case has the molecular arrangement produced by the physical treatment been fixed by chemical reaction after the new molecular arrangement has been given to the material by the physical treatment.

As already explained, my invention may be practiced either by incorporating the active substance in the original mix and after physical treatment causing the reaction to take place, for instance by heating, or it may be practiced, particularly in the manufacture of fibers of small diameters, by incorporating the active agents with the base after the formation of the filaments and after physical treatment and then causing the reaction.

The essential feature of my invention lies in the application of molecular orientation to a material which is adapted to such treatment and subsequently subjecting the material to chemical treatment which not only fixes the orientation and the resulting physical properties such as increased tensile strength and resilience but also may give to the final product additional properties such as high resistance to water. In other words the properties such as resilience and tensile strength are imparted to the material at an intermediate stage prior to the formation of the utimate chemical product.

The following specific examples will explain further the actual procedure which may be employed in carrying out my invention. In these examples all parts are by weight.

*Example 1*

In a typical example the following procedure was followed and the results stated were obtained.

To 100 grams of polyvinyl alcohol were added 25 grams of paraldehyde, and 25 grams of methanol. The viscosity of the polyvinyl alcohol used was 55 centipoises at 20° C. for a four per cent solution in water. After a thorough mixing of the above ingredients, 185 grams of water were added slowly under vigorous stirring. The mixture was then heated in a container having a vapor line to permit a slow removal of methanol, on a water bath for 8 hours. From being originally a wet powder, the mixture became a viscous gel at the end of the heating. This mass was transferred to an extrusion mold and the mold closed and left in an oven at 60° C. for 18 hours to permit the removal of bubbles.

The material was then extruded through a die having an orifice of 0.060 in. The die temperature was 72° C., the body temperature 52° C., and the extrusion pressure 110 lbs. per square inch. Under these conditions the fiber as it issued from the nozzle had a total solids content of about 28%.

The fiber was then air-dried for 3 hours at room temperature, then stretched to about four times its original length. It was then air-dried and stretched for 16 hours more under a constant tension which increased the length to from 5 to 6 times the original length.

While maintained at constant length, the fiber was then immersed in water at room temperature for 1 hour, then transferred to a bath consisting of crotonaldehyde saturated with water 90 parts, dibutyl phthalate 7.5 parts, and maleic anhydride 2.5 parts. After 2 hours in the bath, the fiber was air-dried for 1¼ hours, then heated at 80° C. for 1 hour and 2 hours at 120° C. This brings about the chemical reaction between the aldehydes and polyvinyl alcohol.

The fiber formed as above was found to have a tensile strength of 56,700 lbs. per square inch after the physical and chemical treatment, while before treatment it had only 15,000 lbs. per square inch. Such a fiber was essentially unaffected when immersed in boiling water for one minute, whereas the untreated fiber was almost instantly dissolved. A treated fiber also shrank less than 1% in length when immersed in boiling water for one minute. The resilience measured by bending at an angle of about 90° and observing its recovery was much greater than that of the untreated fiber. It was also observed that while the untreated fiber as already stated dissolved almost instantly in boiling water, the fiber which had been oriented by stretching but which had not been fixed by chemical treatment shrank into a ball on immersion in boiling water and then dissolved; while a similar fiber, the molecules of which had been oriented by stretching and these physical properties fixed by subsequent chemical treatment, shrank only about 1% in length when immersed in boiling water for one minute.

This example shows that an aldehyde-yielding material such as paraldehyde added to polyvinyl alcohol before the fiber is formed, together with proper after treatment fixes the improved physical properties of the fiber which were imparted to it by the stretching treatment.

*Example 2*

In another example the procedure was as follows:

To 100 grams of polyvinyl alcohol of the same viscosity, as in Example 1, were added 15 grams of paraldehyde and 220 grams of methanol, followed by thorough mixing. Then 220 grams of water were added and well mixed. The mixture was heated in a container having a vapor line to permit a slow removal of methanol. The heating was done on a water bath for 5 hours. The viscous solution was transferred to a mold and left in an oven at 60° C. for 18 hours as in Example 1.

It was extruded at a die temperature of 45° C. and a body temperature of 65° C. with a pressure of 60 lbs. per square inch through an orifice having a diameter of 0.060 inch. The fiber issuing from the nozzle was found to have a total solids content of about 25%.

The fiber was air-dried for 3 hours at room temperature, stretched to about four times its length, and air-dried further for 24 hours under a constant tension of approximately 10,000 lbs. per square inch which increased the length to from 5 to 6 times its original length.

The fiber was then immersed without preswelling in the bath described in Example 1 for one hour with no attempt to maintain a constant length. After the immersion, the fiber was placed under tension and was air-dried for 18 hours under tension, followed by heating at 120° C. for 1 hour at constant length. This heating brings about the reaction between the aldehydes and the polyvinyl alcohol.

In this case it was found that the tensile strength of the fiber had increased from about 15,000 lbs. per square inch to about 54,000 lbs. per square inch. This fiber had also become insoluble when immersed in boiling water for five minutes or longer and after submersion in water at 180° F. for one minute showed no perceptible shrinkage. As in the previous example the untreated material which had not been subjected to either physical or chemical treatment dissolved immediately on immersion in water at 180° F.; the material which had been stretched but had not been chemically treated curled up into a ball and practically dissolved under these conditions; but material which had been stretched and then subjected to chemical treatment was found to have no substantial shrinkage under the same conditions. This material in its untreated condition was brittle, was fairly resilient after having been stretched and had very good resilience— better than Example 1—after the final chemical treatment.

This example shows that variations in the proportions of the mixture from which the fiber is to be formed, as well as in the severity of the chemical after treatments, are possible without loss of fixing efficiency in the chemical treatment, or in the physical properties imparted by the stretching treatment.

*Example 3*

To 100 grams of polyvinyl alcohol of the same viscosity as in foregoing examples were added and mixed 25 grams of paraldehyde, 30 grams of methanol and 185 grams of water. Mixing, heating to remove methanol, and heating in the mold were carried out as in Example 2.

Extrusion was carried out at 60° C. die temperature, 80° C. body temperature with a pressure of 75 lbs. per square inch. The orifice of the die had a diameter of 0.060 inch. The total solids were found to be 41.0%.

The fiber was air-dried, stretched to about four times its length and further air-dried under a constant tension of roughly 10,000 lbs. per square inch which increased its length.

The fibers so produced were immersed without preswelling for two hours, at room temperature and at constant length in the bath described in the previous examples. After air-drying for 16 hours under constant length after the immersion, the fiber was heated at 120° C. for 2 hours, still at constant length.

In this case it was found that the tensile strength of the fiber has increased from about 15,000 lbs. per square inch to 53,700 lbs. per square inch. This fiber had also become insoluble when immersed in boiling water for five minutes or longer and submersion in boiling water for one minute showed a shrinkage of approximately 1%. As in the previous example, the untreated material which had not been subjected to either physical or chemical treatment dissolved immediately on immersion in boiling water; the material which had been stretched but not chemically treated curled up into a ball and dissolved but the material which had been stretched and then subjected to chemical treatment was found to have only a shrinkage of about 1%. This material in its untreated condition was brittle but when completed by the treatment described had a better resilience, though not as good as that of the materials produced by the previous examples.

This example shows that a substantial increase in the total solids content of the fiber-forming mixture is possible without loss of fixing efficiency of the chemical after treatment.

*Example 4*

To 100 grams of polyvinyl alcohol of the same viscosity, as in foregoing examples, were added and mixed 25 grams of methanol and 185 grams of water. Mixing, heating to remove methanol, and heating in the mold were carried out as in Example 2.

Extrusion was carried out at 60° C. die temperature, 70° C. body temperature with a pressure of 90 lbs. per square inch. The orifice of the die had a diameter of 0.060 inch. The total solids were found to be 28.6%.

The fiber was air-dried, stretched to about four times its length and further air-dried under a constant tension of roughly 10,000 lbs. per square inch which increased its length.

The fibers so produced were immersed for 3½ hours at room temperature and a constant length in a 15% solution of oxalic acid in water. After air-drying for 24 hours under constant length after the immersion, the fiber was heated at 170° C. for 2 hours, still at constant length.

In this case it was found that the tensile strength of the fiber had increased from about 15,000 lbs. per square inch to 72,700 lbs. per square inch. This fiber had also become insoluble when immersed in boiling water for about 1 minute. At the end of this period the fiber showed a shrinkage of approximately 2%. As in the previous examples, the untreated material which had not been subjected to either physical or chemical treatment dissolved immediately on immersion in boiling water; the material which had been stretched but not chemically treated curled up into a ball and dissolved but the material which had been stretched and then subjected to chemical treatment was found to have only a shrinkage of about 2%. This material in its untreated condition was brittle but when completed by the treatment described had a better resilience, though not as good as that of the materials produced by Examples 1 and 2.

This example shows that a polybasic acid alone, such as oxalic acid, even when incorporated after the fiber or object is formed, will, under proper conditions, produce the desired fixing effect of the physical properties of the final fiber.

*Example 5*

To 100 grams of polyvinyl alcohol of the same viscosity as in foregoing examples, were added and mixed 75 grams of paraldehyde, 25 grams of methanol, and 185 grams of water. Mixing, heating to remove methanol, and heating in mold were carried out as in preceding examples.

Extrusion was carried out at 72° C. die temperature, 92° C. body temperature, with a pressure of 120 lbs. per square inch. The orifice of the die had a diameter of 0.060 inch. The total solids were found to be 35.4%.

The fiber was air-dried, stretched to about four times its length and further air-dried under a constant tension of roughly 10,000 lbs. per square inch which increased its length.

The fibers so produced were immersed for 3½ hours at room temperature and a constant length in a 2% solution of maleic anhydride in water. After air-drying for 16 hours under constant length after the immersion, the fiber was heated at 100° C. for 3 hours, still at constant length.

In this case it was found that the tensile strength of the fiber had increased from about 15,000 lbs. per square inch to 82,600 lbs. per square inch. This fiber had also become insoluble when immersed in boiling water for 5 minutes or longer, and submersion in boiling water for 1 minute showed a shrinkage of approximately 6%. As in the previous examples, the untreated material which had not been subjected to either physical or chemical treatment dissolved immediately on immersion in boiling water; the material which had been stretched but not chemically treated curled up into a ball and dissolved but the material which had been stretched and then subjected to chemical treatment was found to have only a shrinkage of about 6%. This material in its untreated condition was brittle but when completed by the treatment described had a fair resilience, markedly better than the resilience of the untreated material.

This example shows that it is possible to incorporate in the fiber-forming mixture a sufficient amount of reactive agents, in this case an aldehyde-yielding material, such as paraldehyde, followed by the introduction of a catalyst where desirable, in this case maleic anhydride, to secure fixing of the physical properties imparted by orienting the fiber or object, for instance, by stretching.

It will be noted that in Example 1 7.5 parts of dibutyl phthalate are used in the bath. While dibutyl phthalate is used as a plasticizing agent for certain materials it is substantially incompatible with polyvinyl alcohol here employed. I have found, however, that when certain plasticizers such as dibutyl phthalate are introduced in the bath together with crotonaldehyde and maleic anhydride, the acetal resins formed in situ were compatible with the plasticizer, i. e., the dibutyl phthalate, as shown by the transparency of the final fiber. The resulting product also showed marked improvement in resilience as a result of the plasticizing effect of the dibutyl phthalate. The discovery that it is possible to produce compatibility between otherwise incompatible base materials and plasticizers is believed to be a novel and important invention but is not claimed herein, as I intend to make it the subject of a separate application for Letters Patent.

From the foregoing it will be observed that it is possible not only to form the filament or other shape from the base material and subsequently react it with the reactive substance, but also it is possible to form the shape from an original mixture of the base material and the reactive substance, causing the reaction to take place after the physical treatment by the application of heat or a catalyst or even to include both the reactive substance and the catalyst in the original mixture.

While the solvent employed in each of the examples previously given has been water, that being the most satisfactory solvent for the particular materials employed, I do not limit myself to the use of water as a solvent since the solvent will be chosen with regard to the particular characteristics of the materials used and the conditions under which the formation of the final article is carried out.

I claim:

The method which comprises forming into a predetermined shape a mass of a polyvinyl compound containing unreacted hydroxyl groups, stretching the shaped mass beyond its elastic limit and while maintaining such stretched condition reacting said compound with a substance capable of reacting with the hydroxyl groups, said substance being selected from the group consisting of a carboxylic acid, an aldehyde and a ketone.

JOSEPH DAHLE.